United States Patent
Sasaki et al.

(10) Patent No.: US 6,559,224 B1
(45) Date of Patent: May 6, 2003

(54) PROCESS FOR PRODUCING POLYORGANOSILOXANE LATEX

(75) Inventors: Akinobu Sasaki, Otake (JP); Nobuyuki Kikuya, Otake (JP); Haruki Sato, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/465,271

(22) Filed: Dec. 17, 1999

(51) Int. Cl.$^7$ .............................. C08J 3/03; C08L 83/04; B01F 3/08
(52) U.S. Cl. .................... 524/837; 516/59; 516/924; 528/10
(58) Field of Search ..................... 516/59, 924; 528/10; 524/837

(56) References Cited

U.S. PATENT DOCUMENTS 4,476,282 A * 10/1984 Koerner et al. ............. 524/837

FOREIGN PATENT DOCUMENTS

| JP | 6-116496 | | 4/1994 |
| JP | 11-279281 | * | 10/1999 |
| JP | 10-338811 | * | 12/1999 |

OTHER PUBLICATIONS

JPO on EAST, JP410338811A, Mitsubishi Rayon Co, Ltd, Dec. 22, 1998.*
WPI on EAST, week 199913, London: Derwent Publications Ltd, AN 1999–114909, Class A26, JP 10–338811 A. (Mitsubishi Rayon Co Ltd), abstract.*
Machine Translation of JP 11–279281, <http://www1.ipdl.jpo.go.jp/PA1/cgi-bin/PA1DETAIL>, published Oct. 12, 1999, Japan Patent Office (copyright 1998, 2000) Mar. 2002.*
Hawley's Condensed Chemical Dictionary, Eleventh Edition, Sax and Lewic Sr. editors (Van NOstrand Reinhold Company, NY, NY, copyright 1987) p. 876 (Oct. 1989).*
JPO on East, JP411279281A, Misubishi Rayon Co Ltd, Oct. 12, 1999.*

\* cited by examiner

*Primary Examiner*—Daniel S. Metzmaier
(74) *Attorney, Agent, or Firm*—Oblon, Spivak, McClelland, Maier & Neustadt, P.C.

(57) ABSTRACT

In order to easily and effectively polymerize an organosiloxane and produce a polyorganosiloxane latex from which the organosiloxane monomer does not emerge and which has a weight-average diameter controlled to under 0.4 $\mu$m, a paste is polymerized which contains at least a cyclic organosiloxane, a surface active agent, an initiator, and water, and which is an emulsified dispersion of the cyclic organosiloxane, in which the water content is in a proportion of 1 to 66 parts by weight with respect to 100 parts by weight of the cyclic organosiloxane. A latex obtained by diluting the thus-obtained polymerized paste has excellent liquid stability. The above paste, which is an emulsified dispersion of the cyclic organosiloxane, can be produced by mixing the organosiloxane, the surface active agent, the initiator, and the water together in an emulsifying and dispersing machine, and dispersing therein.

5 Claims, No Drawings

PROCESS FOR PRODUCING POLYORGANOSILOXANE LATEX

BACKGROUND OF THE INVENTION

1. Field of the Invention

The present invention relates a process for producing a polyorganosiloxane latex.

2. Description of Related Art

A polyorganosiloxane latex can be used as various polymeric materials such as adhesives, sealants, and impact resistant resins. As a process for producing such a polyorganosiloxane latex, a process in which a liquid mixture containing an organosiloxane, which is a monomer, an initiator, a surface active agent, and water is emulsified, and the emulsion is heated to allow polymerization to occur therein, and a process in which a polyorganosiloxane, which is a polymer, is dispersed to form an emulsion using an emulsifying and dispersing machine have been known. However, there has been a problem that in the case when the water content is large with respect to the organosiloxane, the emulsion is unstable and phase separation of the organosiloxane and water occurs with the passage of time. Therefore, there have been problems that the process of polymerization of the organosiloxane is retarded, the organosiloxane is not effectively used for the polymerization, and unpolymerized organosiloxane emerges on the surface of the latex.

On the other hand, in the process in which a polyorganosiloxane is dispersed in water using an emulsifying and dispersing machine, a special emulsifying and dispersing machine is required as described in Japanese Unexamined Patent Application, First Publication (Kokai), No. Hei 8-198969, or there is a disadvantage that the particle diameters of the polyorganosiloxane become as large as 0.4 $\mu$m or larger, which degrades the transparency of the coated film obtained from the latex.

BRIEF SUMMARY OF THE INVENTION

An object of the present invention is to provide a process for producing a polyorganosiloxane latex according to which polymerization of a cyclic organosiloxane proceeds easily, the cyclic organosiloxane effectively becomes a polyorganosiloxane from which cyclic organosiloxane does not emerge, and the weight-average diameter of the polyorganosiloxane is controlled to under 0.4 $\mu$m.

The subject matter of the present invention is a process for producing a polyorganosiloxane latex, the process comprising polymerizing a paste which contains at least a cyclic organosiloxane, a surface active agent, an initiator, and water, and which is an emulsified dispersion of the cyclic organosiloxane, in which the water content is in a proportion of 1 to 66 parts by weight with respect to 100 parts by weight of the cyclic organosiloxane.

By producing the polyorganosiloxane latex according to the above production process, phase separation of the organosiloxane and water does not occur during the polymerization of the paste. Accordingly, polymerization of the cyclic organosiloxane proceeds easily, and a pasty polyorganosiloxane latex from which the cyclic organosiloxane does not emerge can be produced. In addition, by diluting the pasty polyorganosiloxane latex with water and dispersing the polyorganosiloxane in the water, a polyorganosiloxane latex which is stable without emergence of the cyclic organosiloxane can be obtained.

DETAILED DESCRIPTION OF THE INVENTION

In the present invention, the paste for producing the polyorganosiloxane latex contains at least a cyclic organosiloxane, a surface active agent, an initiator, and water, and is obtained by emulsifying a dispersion of a mixed liquid having the composition such that the water content is 1 to 66 parts by weight with respect to 100 parts by weight of the cyclic organosiloxane using an emulsifying and dispersing machine.

The water content in the paste for producing the polyorganosiloxane latex is in a proportion of 1 to 66 parts by weight with respect to 100 parts by weight of the cyclic organosiloxane. A paste having a water content of less than 1 part by weight would not be able to exist stably. A water content of 1 to 66 parts by weight would not cause separation of the cyclic organosiloxane and water, which would emerge as a problem if the water content exceeded 66 parts by weight. This is attributed to the fact that a paste having a water content of 1 to 66 parts by weight has a high viscosity and no fluidity in comparison with an emulsion with a water content of more than 66 parts by weight. Since a paste having a water content of 1 to 66 parts by weight does not cause separation of the cyclic organosiloxane and water, the cyclic organosiloxane is effectively polymerized to form a polyorganosiloxane by heat polymerization of the paste.

If the water content is small, it is sometimes difficult to obtain a paste by feeding a liquid mixture, prepared in advance by combining the entire amounts of the cyclic organosiloxane, the surface active agent, the initiator and water, into an emulsifying and dispersing machine. In such a case, a paste can be obtained by feeding the cyclic organosiloxane into the emulsifying and dispersing machine, and mixing the cyclic organosiloxane with the surface active agent, the initiator, and water in the emulsifying and dispersing machine to disperse the cyclic organosiloxane to form an emulsion. For example, a paste having a small water content can be obtained by feeding the surface active agent, the initiator, and water into the emulsifying and dispersing machine in advance and mixing them to prepare a liquid mixture, and adding the cyclic organosiloxane dropwise to the liquid mixture while successively mixing the cyclic organosiloxane with the above-described liquid mixture in the emulsifying and dispersing machine so as to successively disperse the cyclic organosiloxane to form an emulsion.

As the emulsifying and dispersing machine which is used when preparing the paste, a known type of emulsifying and dispersing machine for use in emulsification and dispersing such as a homomixer, a line mixer, a colloid mill, and a homogenizer can be used. A single emulsifying and dispersing machine or a combination of two or more emulsifying and dispersing machines may be used. The paste which is an emulsified dispersion of the cyclic organosiloxane in water can be obtained using such an emulsifying and dispersing machine.

The thus-obtained paste is polymerized by heating or the like to form a pasty polyorganosiloxane latex (hereinafter occasionally referred to as "polymerized paste"). The heating temperature for polymerizing the cyclic organosiloxane in the paste is not particularly limited. However, in view of the production of the polyorganosiloxane latex within a short period of time, a heating temperature of 30° C. or higher is preferable, and a heating temperature of 50° C. or higher is particularly preferable.

The polymerization of the cyclic organosiloxane is an equilibrium reaction, and the conversion in general under equilibrium condition is about 80 to 90%. According to the production process of the present invention, the paste is preferably polymerized so that a conversion of 80 to 90% can be achieved.

By diluting the above-obtained polymerized paste with water and dispersing the polymerized paste in the water, a polyorganosiloxane latex which has a low concentration of polyorganosiloxane and has a low viscosity can be obtained. This latex diluted with water is stable, and the cyclic organosiloxane does not emerge. Accordingly, production of a latex having a desired concentration of polyorganosiloxane and which has excellent coating properties is easy according to the present invention. Furthermore, normally the dilution of the polymerized paste with water is carried out so that the concentration of the polyorganosiloxane becomes about 20 to 45% by weight.

An example of the cyclic organosiloxane is one expressed by a general formula represented by the following Chemical Formula 1.

Chemical Formula 1

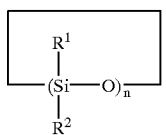

(in the formula, n is a positive integer, preferably 3 to 8, and each of $R^1$ and $R^2$, which may be the same or different, indicates a hydrogen atom or a hydrocarbon group such as a methyl group, an ethyl group, a propyl group, and a phenyl group).

Specific examples of the cyclic organosiloxane are hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane.

In order to graft-polymerize a vinyl polymerizable monomer onto the polyorganosiloxane obtained, a graft crosslinking agent may be added to the organosiloxane. As the graft crosslinking agent, compounds which can form units represented by Chemical Formulae 2 to 4 may be used.

Chemical Formula 2

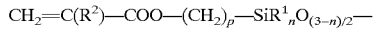

Chemical Formula 3

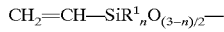

Chemical Formula 4

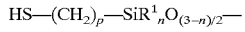

In the above formulae 2 to 4, $R^1$ is a methyl group, an ethyl group, a propyl group, or a phenyl group, $R^2$ is a hydrogen atom or a methyl group, and n is 0, 1, or 2, and P is an integer between 1 and 6.

(Meth)acryloyloxysiloxane expressed by Chemical Formula 2 is preferable. Specific examples are γ-methacryloyloxypropyldimethylmethoxysilane, γ-methacryloyloxypropylmethyldimethoxysilane, γ-methacryloyloxypropyltrimethoxysilane, γ-methacryloyloxypropyldiethylethoxysilane, γ-methacryloyloxypropylethyldiethoxysilane, γ-methacryloyloxypropyltriethoxysilane, γ-methacryloyloxypropylmethyldiethoxysilane, and γ-methacryloyloxypropylethyldimethoxysilane.

A specific example of a compound expressed by Chemical Formula 3 is tetramethyltetravinylcyclotetrasiloxane. Specific examples of a compound expressed by Chemical Formula 4 are γ-mercaptopropyldimethoxymethylsilane, γ-mercaptopropylmethoxydimethylsilane, and γ-mercaptopropyldiethoxymethylsilane.

The amount of the graft crosslinking agent to be used with respect to 100 parts by weight of the organosiloxane is preferably 0 to 10 parts by weight, and particularly preferably 0.5 to 5 parts by weight.

In order to crosslink the polyorganosiloxane, a crosslinking agent may be added to the organosiloxane. As the crosslinking agent, a trifunctional or tetrafunctional silane crosslinking agent such as trimethoxymethylsilane, triethoxyphenylsilane, tetramethoxysilane, tetraethoxysilane, tetra-n-propoxysilane, and tetrabutoxysilane can be used. Tetrafunctional crosslinking agents are particularly preferable, among which tetraethoxysilane is specially preferable. An amount of the crosslinking agent to be used with respect to 100 parts by weight of the organosiloxane is preferably 0 to 10 parts by weight, and particularly preferably 1 to 5 parts by weight.

As the surface active agent, an anionic surface active agent, a cationic surface active agent, or a nonionic surface active agent can be used. The anionic surface active agent to be used may be selected from, for example, alkylbenzenesulfonic acids, alkylbenzenesulfonate salts, alkylnaphthalenesulfonic acids, alkylnaphthalenesulfonate salts, alkylsulfonic acids, alkylsulfonate salts, sulfate esters, and sulfate ester salts. Among these, an alkylbenzenesulfonate salt in which the alkyl group has a carbon atom number of 6 to 18 is preferable, and sodium dodecylbenzenesulfonate is particularly preferable. The cationic surface active agent to be used may be selected from quaternary ammonium salts and the like. An example is dodecyltrimethyleneammonium chloride. Examples of the nonionic surface active agent are polyoxyethylene nonyl phenyl ether, polyethylene glycol, and diethylene glycol. The surface active agent to be used may be of a single type or a mixture of two or more types.

The amount of the surface active agent to be used with respect to 100 parts by weight of the cyclic organosiloxane is preferably 0.1 to 50 parts by weight, and particularly preferably 0.1 to 20 parts by weight.

As the polymerization initiator, an acidic initiator or an alkaline initiator may be used. Examples of the acidic initiator are mineral acids such as hydrochloric acid and sulfuric acid, alkylsulfonic acids, alkylbenzenesulfonic acids, alkylnaphthalenesulfonic acids, and sulfate esters. An alkylbenzenesulfonic acid in which the alkyl group has a carbon atom number of 6 to 18 is preferable, and dodecylbenzenesulfonic acid is particularly preferable. Examples of the alkaline initiator are hydroxides of alkali metals such as sodium hydroxide and potassium hydroxide, and quaternary ammonium hydroxide. The amount of the polymerization initiator to be used varies depending on its type; however, an amount of 0.1 to 50 parts by weight with respect to 100 parts by weight of the cyclic organosiloxane is preferable, and 0.1 to 20 parts by weight is particularly preferable.

A preferable combination of the surface active agent and the polymerization initiator is a combination of an anionic surface active agent and an acidic initiator, a combination of a cationic surface active agent and an alkaline initiator, or a combination of a nonionic surface active agent and an acidic or alkaline initiator.

In the process according to the present invention, the polymerization initiator contained in the polyorganosiloxane paste or latex may be neutralized after the polymerization. In the case where an acidic initiator such as sulfuric acid or dodecylbenzenesulfonic acid is used, neutralization is carried out using a hydroxide of an alkali metal such as sodium hydroxide, a hydroxide of an alkali-earth metal, and the like. In the case where a base such as a hydroxide of an alkali metal such as sodium hydroxide and potassium hydroxide is used, neutralization is carried out using an acid such as sulfuric acid and hydrochloric acid.

EXAMPLES

Examples are described below. In the following Examples, "parts" in parentheses indicate parts by weight with respect to 100 parts by weight of the organosiloxane. In addition, "%" indicates percent by weight. The conversion of the organosiloxane was calculated from the concentration (% by weight) of solid contents which remain after drying the paste or the latex for 30 minutes at 170° C. using a hot air dryer. That is to say, the conversion (%) of the cyclic organosiloxane was calculated by the following formula.

Conversion of organosiloxane (%) =

$$\frac{\text{Concentration of solid contents in paste or latex (\% by weight)}}{\text{Concentration of organosiloxane (\% by weight)}} \times 100$$

Here,

Concentration of organosiloxane (%) =

$$\frac{\text{Amount of organosiloxane in parts by weight}}{\text{(Amount of organosiloxane in parts by weight)} + \text{amount of water in parts by weight}} \times 100$$

Example 1

700 g (100 parts) of a cyclic organosiloxane ("DMC" manufactured by Shin-Etsu Chemical Co., Ltd.) in which octamethylcyclotetrasiloxane was a main component, 3.5 g (0.5 parts) of γ-methacryloyloxypropylmethyldimethoxysilane ("KBM 502" manufactured by Shin-Etsu Chemical Co., Ltd.) as a graft crosslinking agent, 14 g (2 parts) of tetraethoxysilane ("ETHYL SILICATE 28" manufactured by COLCOAT Co., Ltd.) as a crosslinking agent, 18.76 g of a 25% aqueous solution of sodium dodecylbenzenesulfonate ("NEOPELEX F25" manufactured by Kao Corporation) (0.67 parts of sodium dodecylbenzenesulfonate) as a surface active agent, 4.69 g (0.67 parts) of dodecylbenzenesulfonic acid ("NEOPELEX FS" manufactured by Kao Corporation) as an initiator, and 301 g (43 parts) of water were mixed together in a vessel having a capacity of 2 liters. This mixed liquid was fed into a high speed rotary-type emulsifying and dispersing homomixer (manufactured by Tokushu Kika Kogyo Co., Ltd.). By running this homomixer for 3 minutes at 10,000 rpm, a paste which was an emulsified dispersion of the cyclic organosiloxane in water was produced. The composition of this paste was such that it contained water in a proportion of 43 parts with respect to 100 parts of the cyclic organosiloxane, and the concentration of the cyclic organosiloxane in the paste was 70%.

A pasty polyorganosiloxane latex ("polymerized paste") which was an emulsified dispersion of a polyorganosiloxane in water was obtained by heating the paste of the above composition to 80° C. and carrying out polymerization at 80° C. for 7 hours to polymerize the cyclic organosiloxane. The concentration of solid contents of this polymerized paste was 59%, and the conversion was 84%. No emergence of the cyclic organosiloxane was observed in this polymerized paste.

Comparative Example 1

A paste containing water in a proportion of 100 parts with respect to 100 parts of a cyclic organosiloxane was obtained in a manner similar to that of Example 1 except that 700 g (100 parts) of water was used instead of 301 g of water in Example 1. Thereafter, this paste was heated and polymerized in a manner similar to that of Example 1 to produce a latex. The concentration of solid contents of this latex was 34%, and the conversion was 68%, which is far from a conversion in equilibrium of 80 to 90%. Moreover, the cyclic organosiloxane emerged on the top layer of this latex.

Comparative Example 2

Operations which are similar to those of Example 1 were carried out except that 3.5 g of water (0.5 parts with respect to 100 parts of cyclic organosiloxane) was used. However, a paste could not be produced.

Example 2

A polyorganosiloxane latex in which a polyorganosiloxane is dispersed in water was obtained by adding 399 g (57 parts) of water to the polymerized paste obtained in Example 1 so as to dilute the cyclic organosiloxane to a concentration of 50%. The concentration of solid contents (mainly polyorganosiloxane) of the latex diluted with water was 42%, and the conversion was 84%. The particle diameter of the latex after dilution was measured using particle diameter measuring equipment "ELS 800" (manufactured by Otsuka Electronics Co., Ltd.), according to which the weight-average diameter was 0.22 μm.

Example 3

A paste containing water in a proportion of 25 parts with respect to 100 parts of the cyclic organosiloxane was obtained in a manner similar to that of Example 1 except that 800 g (100 parts) of "DMC", 4 g (0.5 parts) of "KBM 502", 16 g (2 parts) of tetraethoxysilane, 21.44 g of a 25% aqueous solution of sodium dodecylbenzenesulfonate (0.67 parts of sodium dodecylbenzenesulfonate), 5.36 g (0.67 parts) of dodecylbenzenesulfonic acid, and 200 g (25 parts) of water were used. The concentration of the cyclic organosiloxane in the paste was 80%. This paste was polymerized in a manner similar to that of Example 1 to produce a polymerized paste. A polyorganosiloxane latex was obtained by adding 1400 g (175 parts) of water to this polymerized paste so as to dilute and disperse the cyclic organosiloxane to a concentration of 33.3%. The concentration of solid contents of the latex after dilution was 28%, the conversion was 84%, and the weight-average particle diameter was 0.22 μm.

Example 4

700 g (100 parts) of "DMC", 35 g (5 parts) of dodecylbenzenesulfonic acid, and 301 g (43 parts) of water were mixed together in a vessel having a capacity of 2 liters. This mixed liquid was fed into a homomixer, which was run for 3 minutes at 10,000 rpm in order to disperse "DMC" in water and emulsify the dispersion so as to produce a paste (which contained 43 parts of water with respect to 100 parts of cyclic organosiloxane). A polymerized paste was obtained by polymerizing this paste at 80° C. for 7 hours. A polyorganosiloxane latex in which the cyclic organosiloxane is diluted and dispersed to a concentration of 33.3% was obtained by adding 1099 g (157 parts) of water to this polymerized paste. The concentration of solid contents of this diluted latex was 29%, the conversion was 87%, and the weight-average particle diameter was 0.18 μm.

Example 5

A polyorganosiloxane latex was produced in a manner similar to that of Example 4 except that 70 g (10 parts) of dodecylbenzenesulfonic acid was used. The concentration of solid contents of the latex after dilution was 29%, the conversion was 87%, and the weight-average particle diameter was 0.15 μm.

Example 6

A polyorganosiloxane latex was produced in a manner similar to that of Example 4 except that 105 g (15 parts) of dodecylbenzenesulfonic acid was used. The concentration of solid contents of the latex after dilution was 29%, the conversion was 87%, and the weight-average particle diameter was 0.1 μm.

Example 7

A mixed liquid was prepared by feeding 21.44 g of a 25% aqueous solution of sodium dodecylbenzenesulfonate (0.67 parts of sodium dodecylbenzenesulfonate), 5.36 g (0.67 parts) of dodecylbenzenesulfonic acid, and 80 g (10 parts) of water into a homomixer and mixing them together in the homomixer. Then, 800 g (100 parts) of "DMC" was added dropwise little by little over a period of 15 minutes to the mixed liquid in the homomixer, while cyclic organosiloxane was mixed with the surface active agent, the initiator, and water, and an emulsified dispersion of the cyclic organosiloxane was formed using the homomixer. The concentration of the cyclic organosiloxane in the thus-obtained paste was 91% (i.e., the water content was 10 parts with respect to 100 parts of the cyclic organosiloxane). The rotational speed of the mixing blade of the homomixer was 10,000 rpm. After this paste was polymerized at 80° C. for 7 hours, 1520 g (190 parts) of water was added to dilute and disperse the cyclic organosiloxane to a concentration of 33.3% so as to produce a polyorganosiloxane latex. The concentration of solid contents of the latex after dilution was 28%, the conversion was 84%, and the weight-average particle diameter was 0.22 μm.

What is claimed is:

1. A process for producing a polyorganosiloxane latex comprising the step of preparing a polymerized paste by polymerizing a paste which contains at least a cyclic organosiloxane, a surface active agent, an initiator, and water, and a graft crosslinking agent and/or a crosslinking agent, and which is an emulsified dispersion of the cyclic organosiloxane, in which the water content is in a proportion of 1 to 66 parts by weight with respect to 100 parts by weight of the cyclic organosiloxane.

2. A process for producing a polyorganosiloxane latex according to claim 1, wherein the conversion by polymerization of the paste is at least 80%.

3. A process for producing a polyorganosiloxane latex according to claim 1, wherein the paste is one obtained by feeding the cyclic organosiloxane into an emulsifying and dispersing machine, and mixing the cyclic organosiloxane with the surface active agent, the initiator, and the water in the emulsifying and dispersing machine to disperse the cyclic organosiloxane to form an emulsion.

4. A process for producing a polyorganosiloxane latex according to claim 1, wherein the process further comprises the step of diluting the polymerized paste with water.

5. A process for producing a polyorganosiloxane latex according to claim 3, wherein the process further comprises the step of diluting the polymerized paste with water.

* * * * *